Sept. 4, 1928.  G. D. PITKIN  1,683,299
WORKTABLE
Original Filed April 8, 1926   3 Sheets-Sheet 1
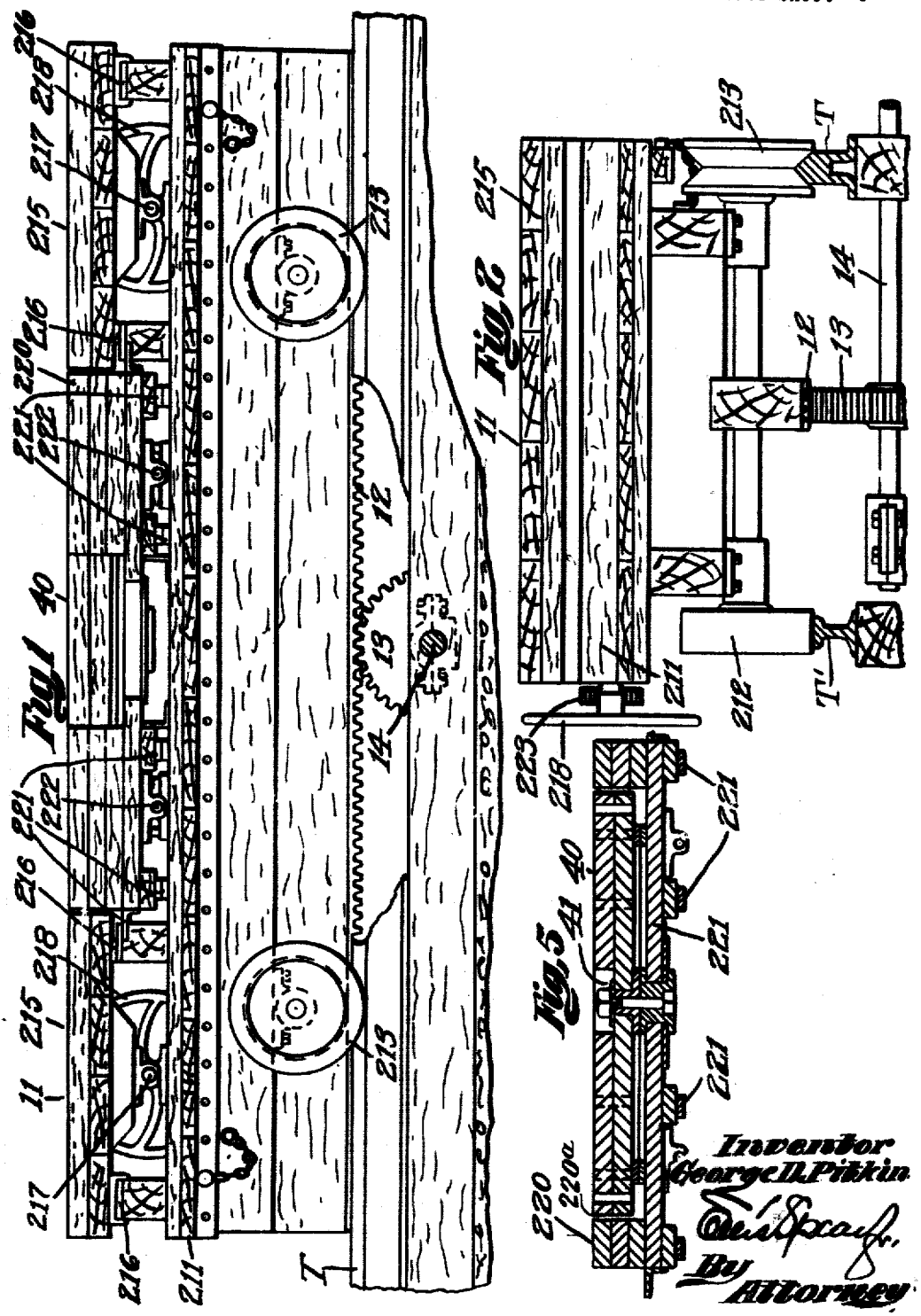

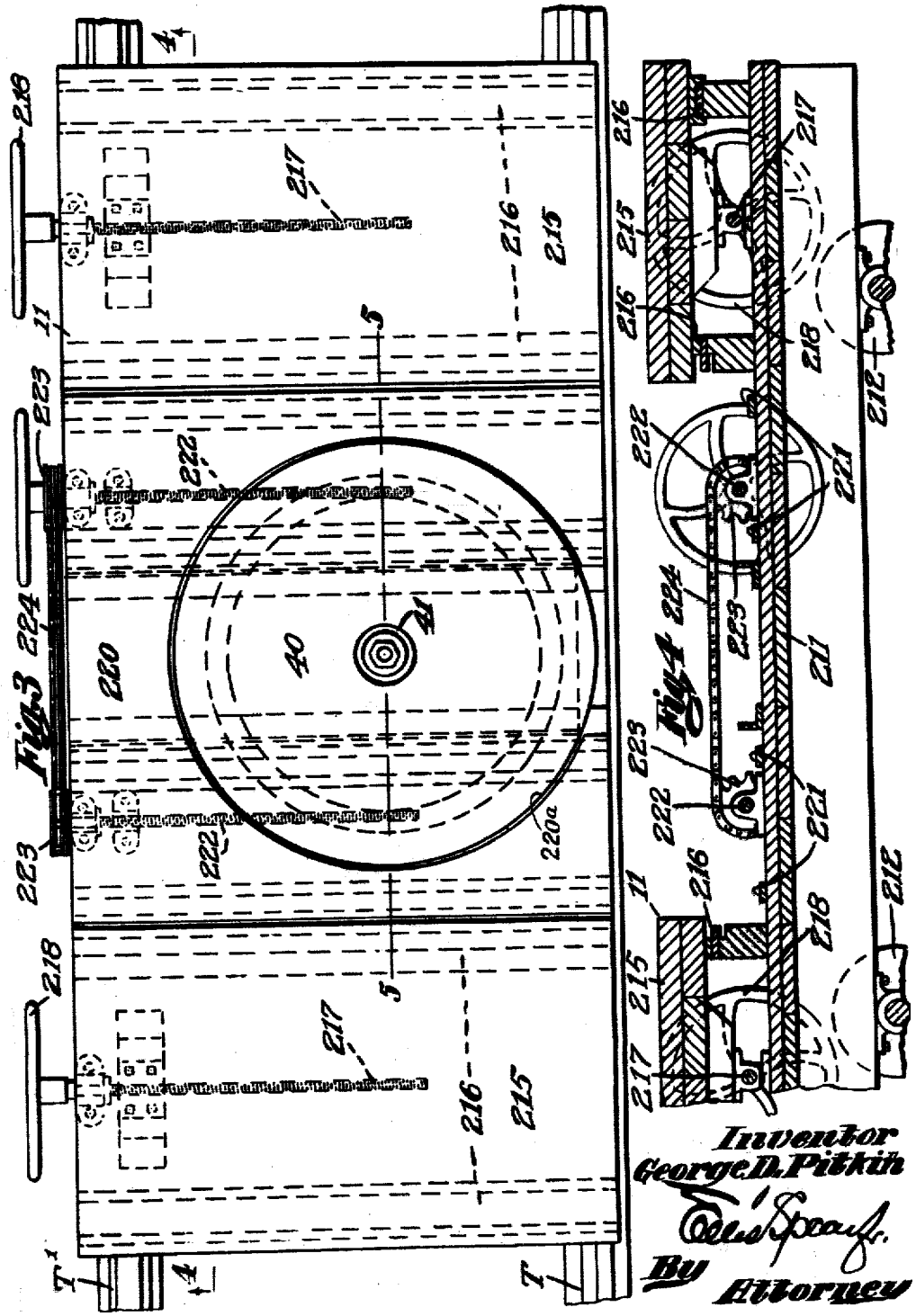

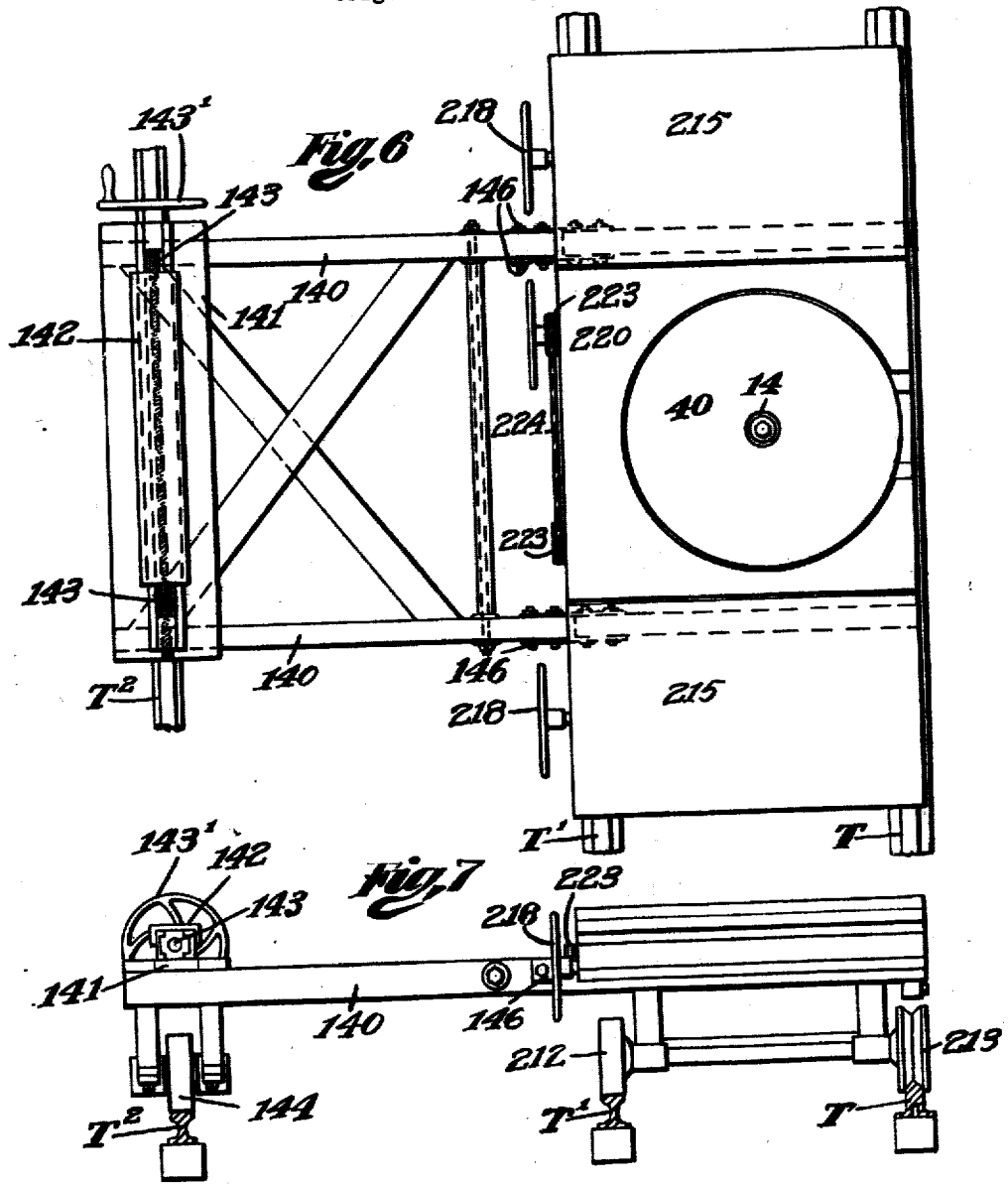

Patented Sept. 4, 1928.

1,683,299

UNITED STATES PATENT OFFICE.

GEORGE D. PITKIN, OF MONTPELIER, VERMONT, ASSIGNOR TO LANE MANUFACTURING COMPANY, OF MONTPELIER, VERMONT, A CORPORATION OF VERMONT.

WORKTABLE.

Original application filed April 8, 1926, Serial No. 100,490. Divided and this application filed October 22, 1926. Serial No. 143,467.

This invention relates to work tables and is a division of my prior application, Serial No. 100,490, filed April 8, 1926, to which reference is made as illustrating one type of machine in which such tables are useful.

My present invention contemplates certain improvements in the construction of the work table used in connection with certain types of stone working machines, as stone sawing or stone polishing machines, to the end that the work (stone) may be more conveniently positioned and more accurately adjusted relative to the saw blade, polishing wheel or other work tool.

This object, together with certain other features of advantage and superiority, which will appear more fully hereinafter, are secured in the work table described and illustrated in the accompanying specification and drawings, and particularly claimed in the appended claims.

In the drawings:

Fig. 1 is a fragmentary side elevation of a work table and associated parts in accordance with my invention.

Fig. 2 is an end elevation of Fig. 1.

Fig. 3 is a plan view thereof.

Figs. 4 and 5 are sections on the lines 4—4 and 5—5, respectively, of Fig. 3, and Figs. 6 and 7 are respectively a plan and an end elevation of a modification adapted for use with an extension carriage.

For the purposes of this application, I shall discuss my invention in its adaptation to a rotary stone saw, although it is to be understood that such treatment is purely illustrative and in no way limiting. In such a machine, the work is slowly traversed longitudinally beneath a rotating saw blade, being automatically reversed at either limit of its travel.

To this end, the stone table, indicated generally at 11, is detachably mounted on a carriage consisting of a frame 211 and supporting trucks 212 and 213, one of which is grooved and rides on a V-topped track rail T while the other is flat and rides on an ordinary I-rail T'. (Fig. 2.)

Longitudinal traversing movement is imparted to the table 11 through any suitable mechanism, as the rack 12 extending longitudinally of the table and engaged by the driving pinion 13 on cross shaft 14, which shaft is driven by worm or otherwise from any suitable power source, as for example a reversing motor.

The table itself comprises three sections; to wit, two end sections and a central section. The end sections comprise end slides 215 mounted on ways 216 and laterally adjusted by individual feed screws 217 controlled by hand wheels 218.

The central section of the table consists of a central slide 220. This slide is movable transversely on ways 221 by means of a pair of transverse feed screws 222 connected to each other by sprockets 223 and a chain 224. The central upper table 220 is provided with a circular recess 220ª, Fig. 5, within which a turn table 40 is mounted. The turn table 40 has a central bearing 41 on which it can be turned by any suitable means to any desired position of adjustment and is locked in such position by any suitable locking means. This permits the stone to be swung on the table to get the best possible alinement of its edge with the saw without having to go through the tedious process of jacking up and prying over as has been heretofore necessary.

For extreme sizes in stone blocks, I provide lateral extension comprising beams 140 (Figs. 6 and 7) which can be adjusted relative to the frame of the car supporting the table 11. The ends of the beams 140 provide a narrow carriage 141 having a slide 142 adjustable by a screw 143 and hand wheel 143'. The carriage runs on trucks 144 on a third rail T² which parallels the rails T' and T. For ordinary work where such an extension is not required, this extension can be detached from the main table as at 146. (See Fig. 7.)

It will thus be seen that I provide a work table in which the several sections thereof are individually and independently adjustable transversely relative to each other, and in which one of the sections, here shown as the central section, is provided with a turntable. These several adjustments, together with the extension arrangement disclosed in Figs. 6 and 7, permit a wide range of adjustment of the stone relative to the saw or other work tool.

Various modifications in the construction and operation of my device may obviously be resorted to, if within the limits of the appended claims.

What I therefore claim and desire to secure by Letters Patent is:

1. In a stone working machine, a stone table having a pair of end ways, an end slide in each way, means for adjusting the slides in the ways, and a central support rotatably mounted between the end supports.

2. In a stone working machine, a stone table having a pair of end ways and a central way, an end slide in each end way, means for moving the slides in said end ways, a central slide, means for adjusting the central slide transversely in said central slideway, and a central support rotatably mounted in said central slide.

3. In a stone working machine, a stone table having a pair of end ways and a central way, an end slide in each end way, means for adjusting said slides in said end ways, a central slide, and means for adjusting the central slide transversely in said central slideway.

4. In a stone working machine, a way, a car movable thereon, a stone table having a pair of end ways and a central way, an end slide in each end way, means for adjusting the slides in said end ways, a central slide in said central slideway, means for adjusting said central slide, and a revoluble section set in the surface of said central slide.

In testimony whereof I affix my signature.

GEORGE D. PITKIN.